United States Patent [19]
Zidek et al.

[11] Patent Number: 6,100,840
[45] Date of Patent: Aug. 8, 2000

[54] RADIO FREQUENCY TAG SYSTEM

[75] Inventors: Paul Donald Zidek, Dayton; John William Sellers, Jr., Spring Valley; Gary A. Thiele; Eugene Edwin Mayle, Jr., both of Dayton; Ronald George Riechers, Beavercreek, all of Ohio

[73] Assignee: Spectra Research, Inc., Dayton, Ohio

[21] Appl. No.: 09/382,515

[22] Filed: Aug. 25, 1999

Related U.S. Application Data

[60] Provisional application No. 60/097,957, Aug. 26, 1998.

[51] Int. Cl.$^7$ ..................................................... G01S 13/79
[52] U.S. Cl. .............................. 342/42; 342/44; 342/45; 342/51
[58] Field of Search .................................. 342/13, 42, 44, 342/45, 50, 51, 187

[56] References Cited

U.S. PATENT DOCUMENTS

| | | | |
|---|---|---|---|
| 2,908,002 | 10/1959 | Van Atta | 343/776 |
| 2,927,321 | 3/1960 | Harris | 375/221 |
| 3,305,863 | 2/1967 | Jacobs | 342/139 |
| 3,371,345 | 2/1968 | Lewis | 342/6 |
| 3,391,404 | 7/1968 | Vogelman | 342/43 |

(List continued on next page.)

OTHER PUBLICATIONS

CISC–94, Joint Service Combat Identification Systems Conference Technical Proceedings vol. 1, Aug. 2–4, 1994, pp. 401–430.

King, "Microwave Homodyne Systems" References, pp. 350–358.

King, Ray J., "Microwave Homodyne Systems" Peter Peregrinus, Ltd., Stevenage, England, 1978, pp. 264–273.

Skolnik et al., "Self–Phasing Array Antennas", Contributions, IEEE Transactions on Antennas and Propagation, Mar. 1964, pp. 142–149.

Pon, Chuck Y., "Retrodirective Array Using the Heterodyne Technique" IEEE Transactions and Antennas and Propagation, Mar. 1964, pp. 176–180.

Hansen R.C., "Communications Satellites Using Arrays*" Proceedings of the IRE, Jun. 1961, pp. 1066–1074.

Bauer, Louis H., "Technique for Amplitude Modulating a Van Atta Radar Reflector*" Proceedings of the IRE, Mar. 1961, pp. 634–635.

King, "Coherent transponding systems" Microwave Homodyne Systems, Chapter 12, pp. 329–348.

*Primary Examiner*—John B. Sotomayor
*Attorney, Agent, or Firm*—Killworth, Gottman, Hagan & Schaeff, L.L.P.

[57] ABSTRACT

The RF tag system of the present invention minimizes the effect of the RF tag on the overall radar cross section (RCS) of the object with which it is associated, tailors the signal reflected from the tag to match the actual RCS of the object with which it is associated, utilizes an RF tag design that reduces degenerative RF coupling at the tag, and is designed to exploit the operational features of conventional pulse Doppler radars. In accordance with one embodiment of the present invention, a radio frequency tag system is provided including an interrogator and a tag. The tag is secured to an object. The interrogator is configured to generate a transmitted electromagnetic interrogation signal at a predetermined interrogation frequency. The tag comprises an antenna array including a plurality of receiver antennas and a plurality of transmitter antennas. The tag is positioned to receive the interrogation signal at the receiver antennas and is operative to return a reflected signal to the interrogator via the transmitter antennas in response to receipt of the interrogation signal. The tag is configured to generate the reflected signal by (i) suppressing reflection of the interrogation signal, and (ii) generating reflected radiation characterized by a frequency spectrum including a plurality of return bands, each of the return bands being characterized by a predetermined return band frequency. The interrogator is configured to detect radiation reflected at the return band frequencies, discriminate between return bands of different frequencies, and identify a binary code defined by the reflected radiation across the plurality of return bands.

40 Claims, 7 Drawing Sheets

U.S. PATENT DOCUMENTS

| | | | |
|---|---|---|---|
| 3,417,398 | 12/1968 | Lewis et al. | 342/6 |
| 3,460,139 | 8/1969 | Rittenbach | 342/60 |
| 3,713,148 | 1/1973 | Cardullo et al. | 342/42 |
| 3,745,569 | 7/1973 | Works et al. | 342/44 |
| 3,836,962 | 9/1974 | Zaleski | 342/6 |
| 3,938,151 | 2/1976 | Trenam | 342/10 |
| 3,938,157 | 2/1976 | Treanam | 342/10 |
| 3,958,246 | 5/1976 | Wohlers et al. | 343/754 |
| 4,068,232 | 1/1978 | Meyers et al. | 342/44 |
| 4,097,007 | 6/1978 | Fagan et al. | 244/3.11 |
| 4,325,146 | 4/1982 | Lennington | 359/155 |
| 4,806,938 | 2/1989 | Meadows | 342/370 |
| 4,839,642 | 6/1989 | Batz | 340/10.31 |
| 5,064,140 | 11/1991 | Pittman et al. | 244/3.13 |
| 5,254,997 | 10/1993 | Cohn | 342/44 |
| 5,274,379 | 12/1993 | Carbonneau et al. | 342/45 |
| 5,276,449 | 1/1994 | Walsh | 342/5 |
| 5,387,916 | 2/1995 | Cohn | 342/44 |
| 5,416,486 | 5/1995 | Koert et al. | 342/42 |
| 5,583,507 | 12/1996 | D'Isepo et al. | 342/45 |
| 5,621,412 | 4/1997 | Sharpe et al. | 342/51 |
| 5,686,920 | 11/1997 | Hurta et al. | 342/42 |
| 5,825,806 | 10/1998 | Tuttle et al. | 375/141 |
| 5,828,693 | 10/1998 | Mays et al. | 375/136 |

RADIO FREQUENCY TAG SYSTEM

CROSS-REFERENCE TO RELATED APPLICATIONS

This application claims the benefit of U.S. Provisional Application Ser. No. 60/097,957, RADIO FREQUENCY TAG SYSTEM, filed Aug. 26,1998.

STATEMENT REGARDING FEDERALLY SPONSORED RESEARCH OR DEVELOPMENT

This invention was made with government support under: Contract No. F33615-97-C-1028 awarded by Department of U.S. Air Force; DARPA Contract No. DAAH01-92-C-R323 awarded by the U.S. Army Missile Command; and Contract No. DAAK60-93-C-0028 awarded by the U.S. Army. The government has certain rights in the present invention.

BACKGROUND OF THE INVENTION

The present invention relates to retroreflective interrogation response systems and, more particularly, to a system utilizing a specialized radio frequency tag configured to enhance the identification of a signal reflected therefrom.

A variety of retrodirective interrogation response systems have been proposed for use in systems for remote detection, location, identification, and monitoring of physical objects including persons and vehicles. Typical systems include a radio frequency (RF) responder, such as a remote tag device, and an interrogator. The remote tag device may be arranged to accept a signal, uniquely encode the signal, and retransmit the encoded signal back to an interrogator.

For example, U.S. Pat. No. 5,254,997, issued to Cohn, teaches a retrodirective interrogation responsive system wherein a responder, illuminated by an interrogator, receives an interrogation signal, modulates information onto the interrogation signal, and retransmits the encoded interrogation signal back in the direction of arrival of the collected interrogation signal. The responder uses a Van Atta array antenna and is capable of responding to an interrogator signal incident over a wide solid angle of arrival while retrodirectively retransmitting without amplification substantially all of the collected signal within a narrow solid angle. The device is capable of accepting a signal, uniquely encoding the signal and retransmitting the encoded signal back to the interrogator.

Although there are a number of advantages associated with the system proposed by Cohn and the other conventional systems noted above, the present inventors have recognized that there is a continuing need for an identification system that provides for further enhancements in the manner in which tags or transponders are constructed and utilized to detect and identify an object with which the tag is associated.

BRIEF SUMMARY OF THE INVENTION

This need is met by the present invention wherein the RF tag system (i) minimizes the effect of the RF tag on the overall radar cross section (RCS) of the object with which it is associated; (ii) tailors the signal reflected from the tag to match the actual RCS of the object with which it is associated; (iii) utilizes an RF tag design that reduces degenerative RF coupling at the tag, and (iv) is designed to exploit the operational features of conventional pulse Doppler radars.

In accordance with one embodiment of the present invention, a radio frequency tag system is provided comprising an interrogator and a tag. The tag is secured to an object. The object may be a moving object or a stationary object. The interrogator is configured to generate a transmitted electromagnetic interrogation signal at a predetermined interrogation frequency. The tag comprises an antenna array including a plurality of receiver antennas and a plurality of transmitter antennas. The tag is positioned to receive the interrogation signal at the receiver antennas and is operative to return a reflected signal to the interrogator via the transmitter antennas in response to receipt of the interrogation signal. The tag is configured to generate the reflected signal by (i) suppressing reflection of the interrogation signal, and (ii) generating reflected radiation characterized by a frequency spectrum including a plurality of return bands, each of the return bands being characterized by a predetermined return band frequency. The interrogator is configured to detect radiation reflected at the return band frequencies, discriminate between return bands of different frequencies, and identify a binary code defined by the reflected radiation across the plurality of return bands.

The binary code defined by the reflected radiation may include data bits, a start bit, and a stop bit. The binary code defined by the reflected radiation may further include data bits distributed across the frequency spectrum of the reflected radiation. The state of each of the data bits may be defined as a function of whether reflected radiation is detected in a corresponding one of the return band frequencies. The interrogator is preferably configured to identify the binary code by recognizing the presence or absence of reflected radiation at each of the return band frequencies.

The tag may be configured to generate successive reflected signals defining distinct binary codes. The successive reflected signals may be selected to define a predetermined data message including a plurality of the distinct binary codes. The tag may be further configured such that each of the distinct binary codes includes a word identifier defined by selected ones of the data bits within the binary code. The interrogator could be arranged to detect a complete set of the successive reflected signals in a single scan of the tag or to detect an individual one of a complete set of the successive reflected signals in a single scan of the tag.

The tag may be configured to operate in a data readout mode in response to the interrogation signal. The data readout mode may be characterized by generation of successive reflected signals defining distinct binary codes. The tag may also be configured to operate in an object identification mode characterized by generation of the reflected signal by the tag and identification of the binary code by the interrogator. The data readout mode may be characterized by generation of successive reflected signals defining distinct binary codes.

In accordance with another embodiment of the present invention, a radio frequency tag system is provided comprising an interrogator and a tag. The tag is secured to an object moving relative to stationary background matter. The interrogator is configured to generate a transmitted electromagnetic interrogation signal in the direction of the object at a predetermined interrogation frequency. The tag comprises an antenna array including a plurality of receiver antennas and a plurality of transmitter antennas. The tag is positioned to receive the interrogation signal at the receiver antennas and is operative to return a reflected signal to the interrogator via the transmitter antennas in response to receipt of the interrogation signal. The tag is configured to generate the reflected signal by (i) suppressing reflection of the interrogation signal, and (ii) generating reflected radiation characterized by a frequency spectrum including at least one return band characterized by a predetermined return band frequency. The interrogator is configured to detect radiation reflected from the object at a Doppler-shifted frequency representative of a velocity of the object relative to the interrogator. The interrogator is configured to detect radiation reflected from the tag at the return band frequency. The interrogator is configured to discriminate against radiation reflected from the background matter within a clutter frequency band. The tag is configured such that the return band frequency lies outside of the clutter frequency band and outside of a Doppler-shifted frequency band including expected Doppler-shifted frequencies of targets in the vicinity of the tagged object. The interrogator may comprise an airborne radar system mounted to a moving object and the tag may be mounted to an additional moving airborne object.

In accordance with yet another embodiment of the present invention, a radio frequency tag system is provided comprising an interrogator and a tag. The tag is secured to an object. The object may be a moving object or a stationary object. The interrogator is configured to generate a transmitted electromagnetic interrogation signal at a predetermined interrogation frequency. The object is characterized by a predetermined object radar cross section. The tag comprises an antenna array including a plurality of receiver antennas and a plurality of transmitter antennas. The tag is positioned to receive the interrogation signal at the receiver antennas and is operative to return a reflected signal to the interrogator via the transmitter antennas in response to receipt of the interrogation signal. The tag is configured to generate the reflected signal by (i) suppressing reflection of the interrogation signal, and (ii) generating reflected radiation characterized by a frequency spectrum including at least one return band characterized by a predetermined return band frequency and radar cross section. The tag is configured to generate the return band such that the return band radar cross section is substantially equal to the predetermined object radar cross section.

The interrogator is preferably configured to detect radiation reflected at the return band frequency. The tag preferably comprises an active Van Atta array and includes a balanced modulator arranged to contribute to the suppressed reflection of the interrogation signal and the generation of the reflected radiation.

The tag is preferably configured to generate the reflected signal by generating reflected radiation characterized by a frequency spectrum including a plurality of return bands such that (i) each of the return bands is characterized by a predetermined return band frequency, and (ii) each of the return bands is characterized by substantially equal radar cross sections. The interrogator is preferably configured to detect radiation reflected at the return band frequencies and discriminate between return bands of different frequencies.

In accordance with yet another embodiment of the present invention, a radio frequency tag system is provided comprising an interrogator and a tag. The tag is secured to an object. The object may be a moving object or a stationary object. The interrogator is configured to generate a transmitted electromagnetic interrogation signal at a predetermined interrogation frequency. The tag comprises an antenna array including a plurality of receiver antennas and a plurality of transmitter antennas. The tag is positioned to receive the interrogation signal at the receiver antennas and is operative to return a reflected signal to the interrogator via the transmitter antennas in response to receipt of the interrogation signal at the receiver antennas. The receiver antennas comprise a plurality of parallel antenna elements oriented in a first direction. The transmitter antennas comprise a plurality of parallel antenna elements oriented in a second direction orthogonal to the first direction. The receiver antennas and the transmitter antennas lie in a common plane. The receiver antennas are coupled to corresponding transmitter antennas along an array of transmission lines. The receiver antennas and the transmitter antennas are separated by radio frequency absorbing material arranged to suppress radio frequency coupling between the receiver antennas and the transmitter antennas. The tag is configured to generate the reflected signal by (i) suppressing reflection of the interrogation signal, and (ii) generating reflected radiation characterized by a frequency spectrum including at least one return band characterized by a predetermined return band frequency. The interrogator is configured to detect radiation reflected at the return band frequency.

The antenna elements preferably comprise slot antennas and the antenna elements of the receiver array and the transmitter array lie in a common plane. The radio frequency absorbing material is preferably positioned in the common plane between adjacent transmission lines.

The tag is configured such that respective active gain channels couple each of the receiver antennas to corresponding ones of the transmitter antennas. Each of the respective active gain channels include at least one radio frequency modulator stage and one radio frequency amplifier stage. To help isolate the impedance of the slot antennas, the radio frequency modulator stage may be positioned between an input radio frequency amplifier stage and an output radio frequency amplifier stage.

The modulator stage preferably comprises a balanced modulator and includes a radio frequency isolation network. The radio frequency isolation network may include a plurality of transmission lines and at least one radial stub. Each of the respective active gain channels may include a balanced modulator comprising a ½ wavelength transmission line. The ½ wavelength transmission line may comprise three microstrip transmission lines arranged in a "U" shape.

Accordingly, it is an object of the present invention to provide a radio frequency tag system that enhances the manner in which tags or transponders are constructed and utilized to detect, identify, and communicate with an object with which the tag is associated. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
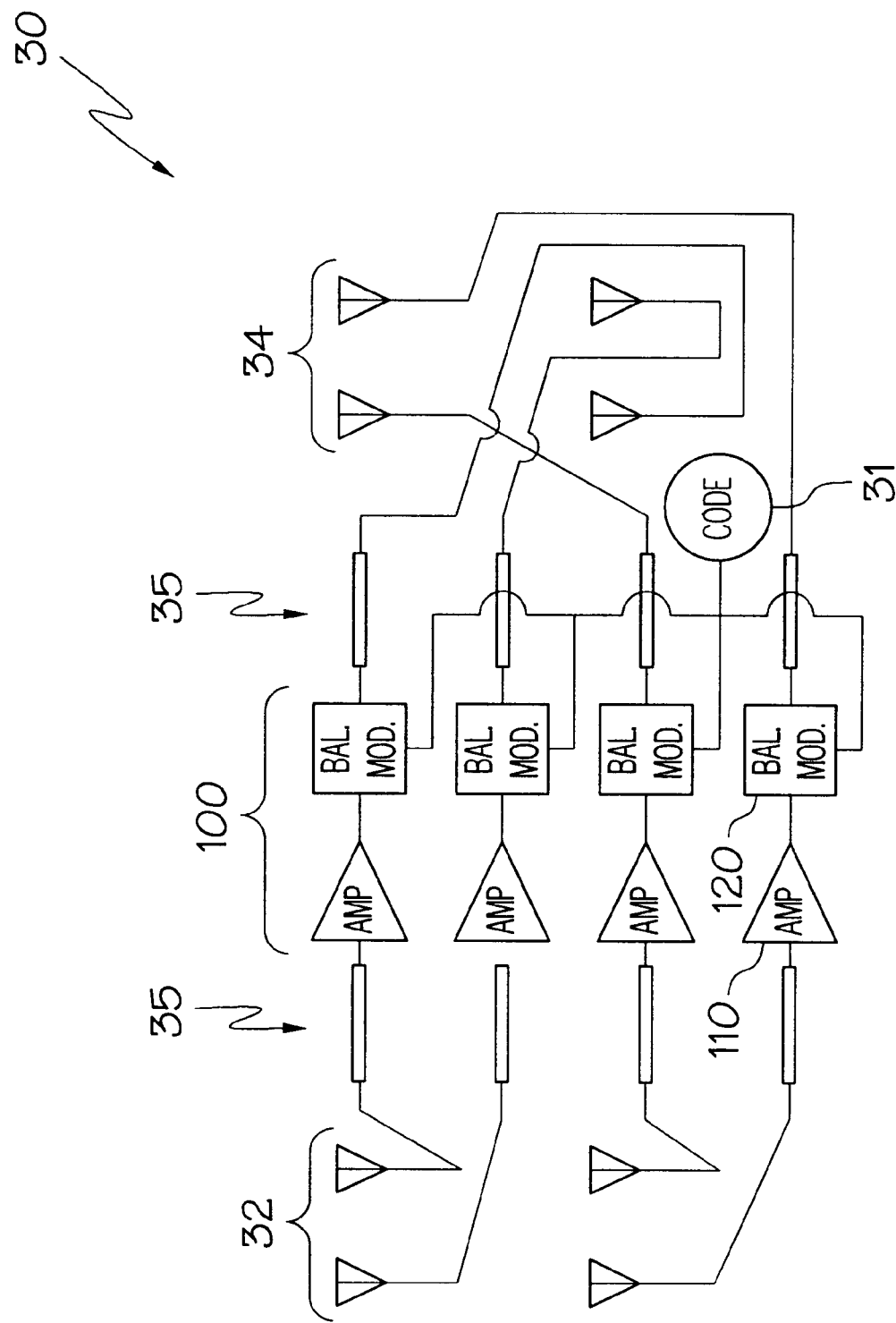
FIG. 1 is schematic illustration of a radio frequency tag according to the present invention arranged as an active Van Atta array.
Figure 2:
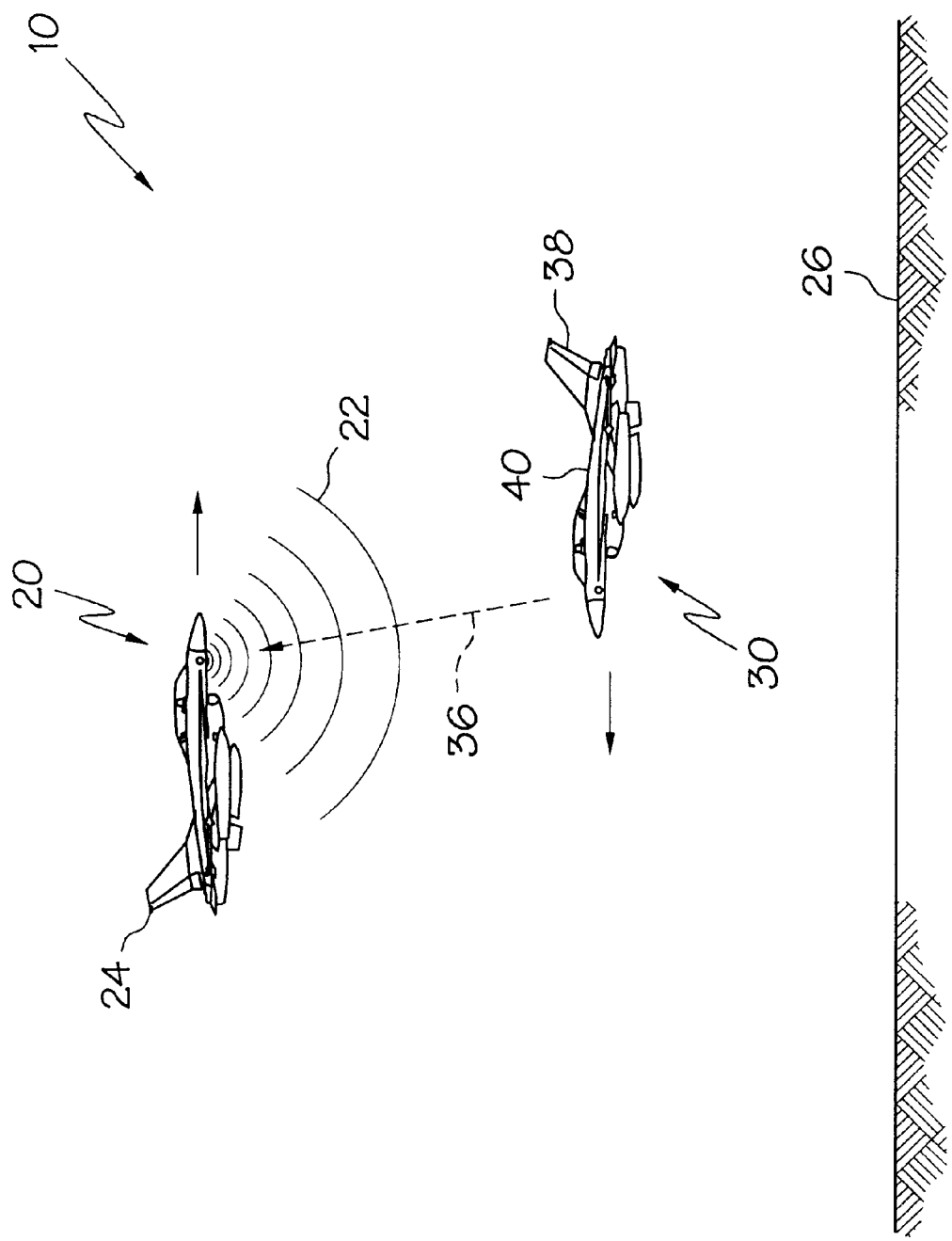
FIG. 2 is an illustration of an airborne radio frequency tag system according to the present invention.

According to a preferred embodiment of the present invention, as illustrated in FIGS. 1 and 2, a radio frequency (RF) tag system 10 is provided comprising an interrogator 20 and a tag 30. The tag 30 is secured to an object 40 subject to identification or designated for communication. For the purposes of describing and defining the present invention, a radio frequency comprises any frequency at which electromagnetic radiation of energy is useful for communication purposes.

The interrogator 20 is configured to generate a transmitted electromagnetic interrogation signal 22 at a predetermined interrogation frequency (see FIG. 2). In a preferred embodiment of the present invention, the electromagnetic interrogation signal 22 comprises a pulsed radio frequency signal of about 9000 MHz to about 10,000 MHz.

Referring specifically to FIGS. 1 and 2, the tag 30 comprises an antenna array including a plurality of receiver antennas 32 and a plurality of transmitter antennas 34. The tag 30 is positioned on the object 40 to receive the interrogation signal 22 at the receiver antennas 32 and is operative to return a reflected signal 36 to the interrogator via the transmitter antennas 34 in response to receipt of the interrogation signal 22.

The tag 30 is configured to generate the reflected signal 36 by suppressing reflection of the interrogation signal 22 and generating reflected signal or reflected radiation 36 characterized by a frequency spectrum including a plurality of return bands, each of the return bands being characterized by a predetermined return band frequency. The specific frequency spectrum characteristics of the reflected radiation 36 are specified by a user-controlled or programmed code signal source 31. A detailed description of a suitable tag structure is presented herein with reference to FIGS. 5 and 6. A detailed description of suitable reflected signal spectra is presented herein with reference to FIGS. 3 and 4A–C. The interrogator 20 is configured to detect radiation reflected at the above-noted return band frequencies, discriminate between return bands of different frequencies, and identify a binary code 60 defined by the reflected radiation across the plurality of return bands.

Figure 3:
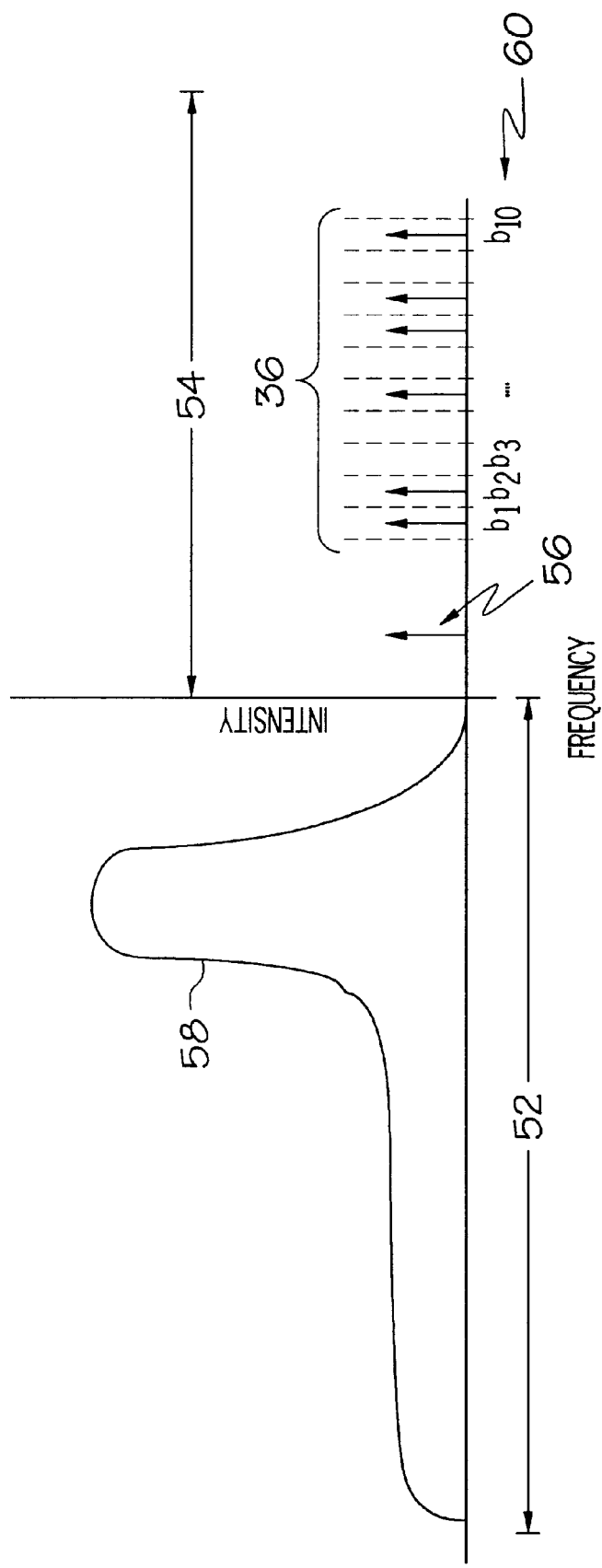
FIG. 3 is a graphical representation of particular signal processing characteristics of a radio frequency tag system according to the present invention.

Referring now to FIG. 3, the frequency spectrum 50 of the reflected signal 36 according to some preferred embodiments of the present invention, is described in more detail. The manner in which the binary code 60 is defined by the reflected radiation 36 is represented in FIG. 3, wherein the frequency spectrum 50 includes a clutter rejection region 52 and a clear region 54, the frequency limits of which may be set in the control hardware of the interrogator 20. The clutter rejection region 52 is set so that it includes signal data 58 representative of reflections from insignificant objects in the interrogator's field of view. The clear region 54 is set so that it includes a signal data indicative of signal data defining the binary code 60 and the skin return 56 of the object 40, i.e., the signal reflected from the skin of the object 40. The interrogator 20 is configured to discriminate against radiation reflected from any background matter 26 at a clutter frequency band within the clutter rejection region 52. Additionally, the tag 30 is configured such that the return band frequencies generated by the tag 30 according to the code signal source 31 lie outside of the clutter rejection region 52.

Figure 4A:
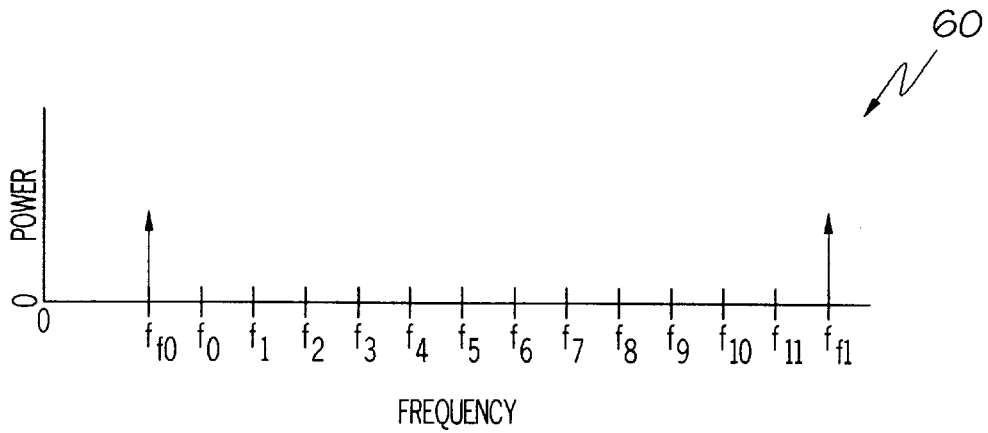
FIGS. 4A–C are illustrations of a binary code defined by radiation reflected from a radio frequency tag according to the present invention.
Figure 4B:
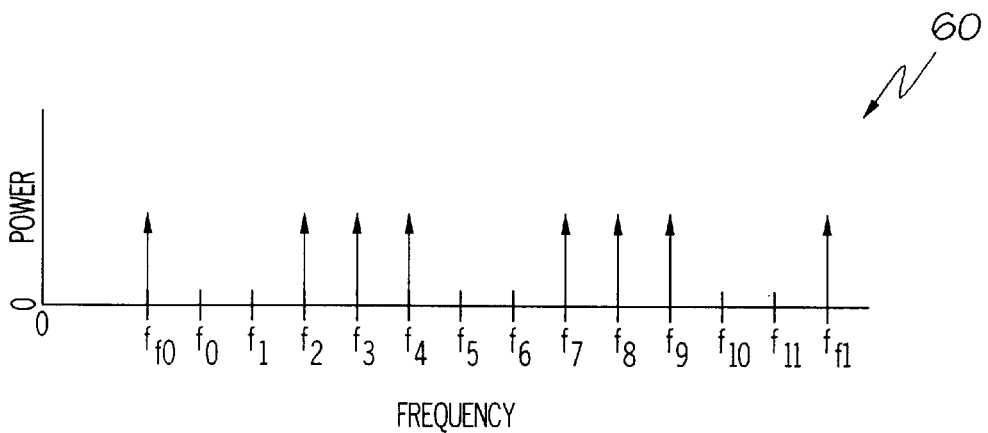
Figure 4C:
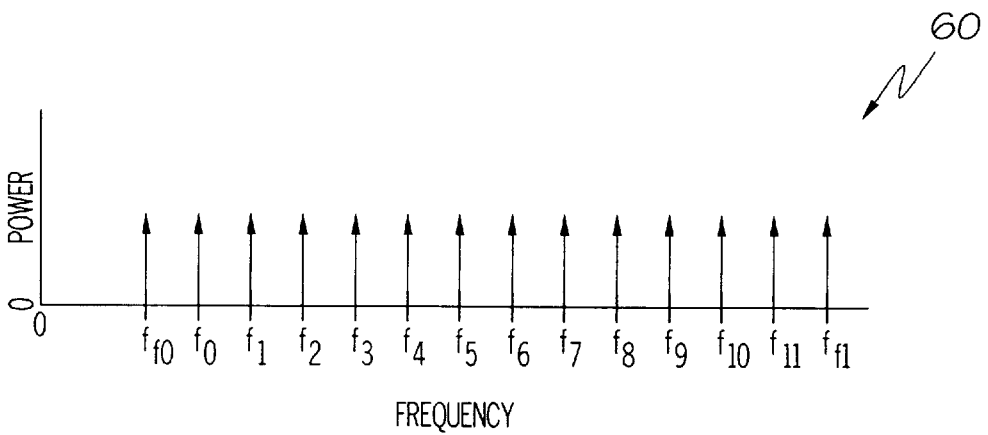

Referring to FIGS. 4A–C, the binary code 60 is arranged so that it includes data bits $f_0$–$f_{11}$, a start bit $f_{f0}$, and a stop bit $f_{f1}$. The tag 30 is configured such that reflected signals are always present at the frequencies corresponding to the start and stop bits $f_{f0}$, and $f_{f1}$. The state of the data bits $f_0$–$f_{11}$, i.e., the presence or absence of reflected radiation at the return band frequencies corresponding to the data bits $f_0$–$f_{11}$, determines the identity of the binary code 60. The manner in which the tag 30 controls the spectrum 50 of the reflected signal 36 is described in detail herein with reference to FIGS. 1, 5, and 6. The interrogator 20 is configured to identify the binary code 60 by recognizing the presence or absence of reflected radiation 36 at each of the return band frequencies.

In one embodiment of the present invention, the tag 30 is configured to generate successive distinct reflected signals 36 defining distinct binary codes 60. FIGS. 4A–4C illustrate three examples of successive distinct reflected signals 36 defining distinct binary codes 60. The successive reflected signals 36 may be selected to define a predetermined data message including the plurality of the distinct binary codes 60. To improve message detection, the tag 30 may be configured such that each of the distinct binary codes 60 includes a word identifier defined by selected ones of the data bits $f_0$–$f_{11}$ within the binary code 60. For example, word identifiers may indicate the positions of particular words within the message.

In certain embodiments of the present invention, the interrogator 20 is arranged to detect a complete set of the successive reflected signals 26 included in the message in a single scan of the tag 30. In this manner, the relevant message is read in a single scan of the tag 30. However, limits in scan time will limit the amount of data that can be read in a single scan. Accordingly, in other embodiments of the present invention the interrogator 20 is arranged to detect individual ones of a complete set of the successive reflected signals 36 in a single scan of the tag 30. In this manner, a collection of scans are utilized to piece together the message.

Figure 7:
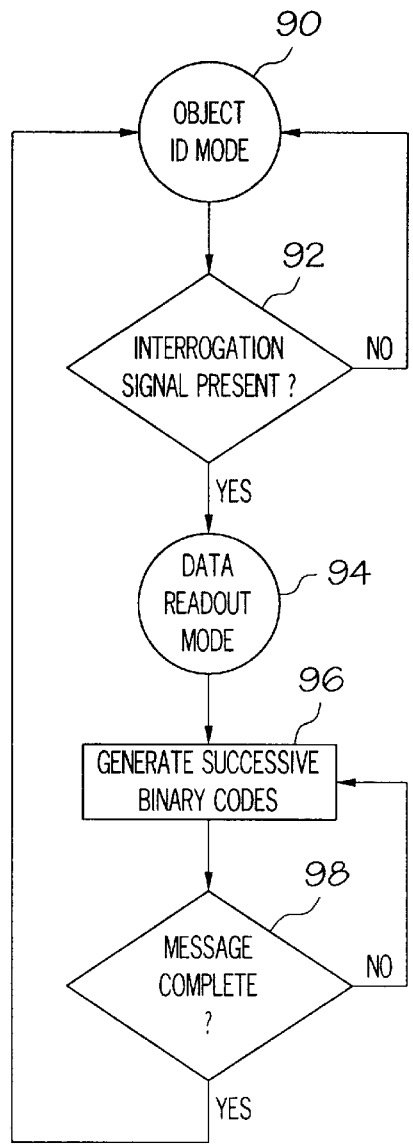
FIG. 7 is a flow chart illustrating an object identification mode and a data readout mode of the present invention.

In further embodiments of the present invention, particularly where the tag 30 is designed to transmit a lengthy data message to the interrogator 20, the tag 30 is configured to operate in an object identification mode and a data readout mode. Specifically, referring to the flow chart of FIG. 7, the tag 30 is configured and initialized to operate in an object identification mode (see step 90). The object identification mode is characterized by generation of the reflected signal 36 by the tag 30 and identification of the binary code 60 by the interrogator 20, as described above. The tag 30 is additionally configured to operate in a data readout mode in response to detection of the interrogation signal (see steps 92 and 94). The tag 30 is configured such that, in the data readout mode, the tag 30 generates successive reflected signals 36 defining distinct binary codes 60 (see steps 96 and 98). In this manner the interrogator 20 and tag 30 of the present invention may be utilized to provide identifying data and to establish a temporary line of communication there between.

As will be appreciated by those practicing the present invention, the amount of data that can be decoded in a single radar scan depends upon the bandwidth and resolution of the reflected signal 36. The spacing of the frequencies within the return band must be large enough to enable the software to positively detect the presence or absence of a spectral line even where the spectral lines are not centered within the respective binary code bands. The available number of data bits is also limited by the fact that the available power in the radar return is divided among the side bands. As the number of bits or side bands increases, the RCS of each side band decreases.

Referring again to the frequency spectrum illustrated in FIG. 3, an additional particularly advantageous feature of the present invention is described. Specifically, the object 40 is characterized by a predetermined object radar cross section. The magnitude of the object radar cross section is represented graphically by the intensity of the skin return 56. The tag 30 is configured to ensure that the radar cross section of the reflected signal 36 matches the radar cross section of the skin return 56. Specifically, the tag 30 is configured to generate the reflected signal 36 such that it is characterized by a predetermined return band radar cross section that is substantially equal to the predetermined object radar cross section. In this manner, the system of the present invention assures that the skin return 56, i.e., the signal reflected from the skin of the object 40, and the reflected signal 36, including the binary code 60, will be detected by the interrogator 20 at substantially the same distance and, hence, the same time. As a specific example, in certain embodiments of the present invention, the radar cross section of each of the return bands is between about 1 m$^2$ and about 10 m$^2$.

Referring now to an embodiment of the present invention that is best illustrated in FIG. 2, the interrogator 20 comprises an airborne radar system mounted to a moving aircraft 24. Similarly, the tag 30 is mounted to an aircraft 38 or other object arranged to move relative to stationary background matter 26. As is the case with most conventional airborne radar systems, the interrogator 20 is configured to detect radiation reflected from the aircraft 38 at a Doppler-shifted frequency representative of a velocity of the aircraft 38 relative to the interrogator 20. According to the teachings of the present invention, the tag 30 is configured such that the return band frequencies lie outside of the normal or expected Doppler-shifted frequency band of the aircraft 38. In addition, the tag 30 is configured such that the return band frequencies lie outside of the clutter frequency band and the clutter rejection region 52. In this manner, the interrogator 20 and the tag 30 help facilitate proper data detection or retrieval.

Referring again to FIG. 1, as is noted above, the tag 30 comprises an antenna array including a plurality of receiver antennas 32 and a plurality of transmitter antennas 34. Each receiver antenna 32 is coupled to a corresponding transmitter antenna 34 along an array of transmission lines 35, the structure and arrangement of which is described in further detail below with reference to FIGS. 5 and 6. In the illustrated embodiment, the antenna elements 32, 34 comprise half wave slot antennas. A slot spaced ⅜ of a wavelength above a wide ground plane is preferred for optimum half power beam width. The selection of a slot antenna for the particular applications of the present inventions is also beneficial because it comprises a rugged mostly metal structure and can be made water or air tight with epoxy or a suitable dielectric cover.

Respective active gain channels 100 couple each of the receiver antennas 32 to corresponding ones of the transmitter antennas 34. A detailed description of the structure and function of the active gain channels 100 is presented herein with reference to FIGS. 5 and 6. Each of the respective active gain channels 100 includes at least one radio frequency modulator stage 120 and a radio frequency amplifier stage 110, the respective structures of which are also described herein with reference to FIGS. 5 and 6.

Figure 8:
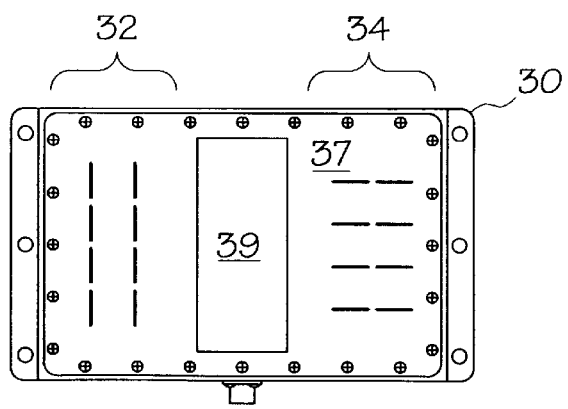
FIG. 8 is a schematic illustration of an antenna and radio frequency absorber layout according to the present invention.

Referring now to an alternative antenna layout of the present invention, as illustrated in FIG. 8, the receiver antennas 32 comprise a plurality of parallel antenna elements oriented in a first direction and the transmitter antennas 34 comprise a plurality of parallel antenna elements oriented in a second direction orthogonal to the first direction. The receiver antennas 32 and the transmitter antennas 34 lie in a common plane. Radio frequency absorbing material 39 is arranged in the plane of the antenna elements 32, 34 to suppress radio frequency coupling between the receiver antennas and the transmitter antennas. The combination of the radio frequency absorber 39 and the orthogonal orientation of the antenna elements minimizes creeping wave radiative coupling between the antenna elements of the receiver and transmitter arrays 32, 34.

Figure 5:
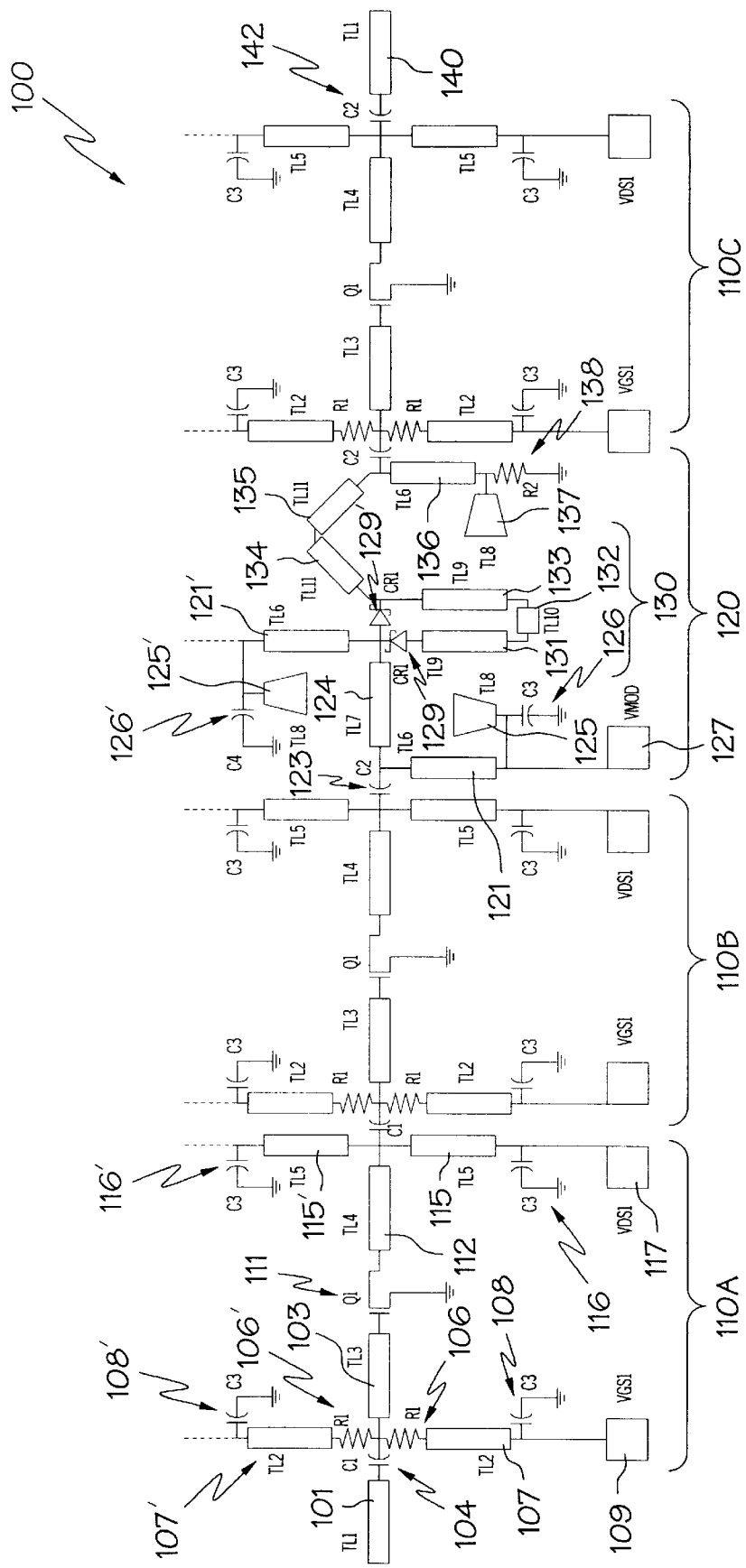
FIG. 5 is a schematic illustration of an active gain channel utilized in a radio frequency tag according to the present invention.
Figure 6:
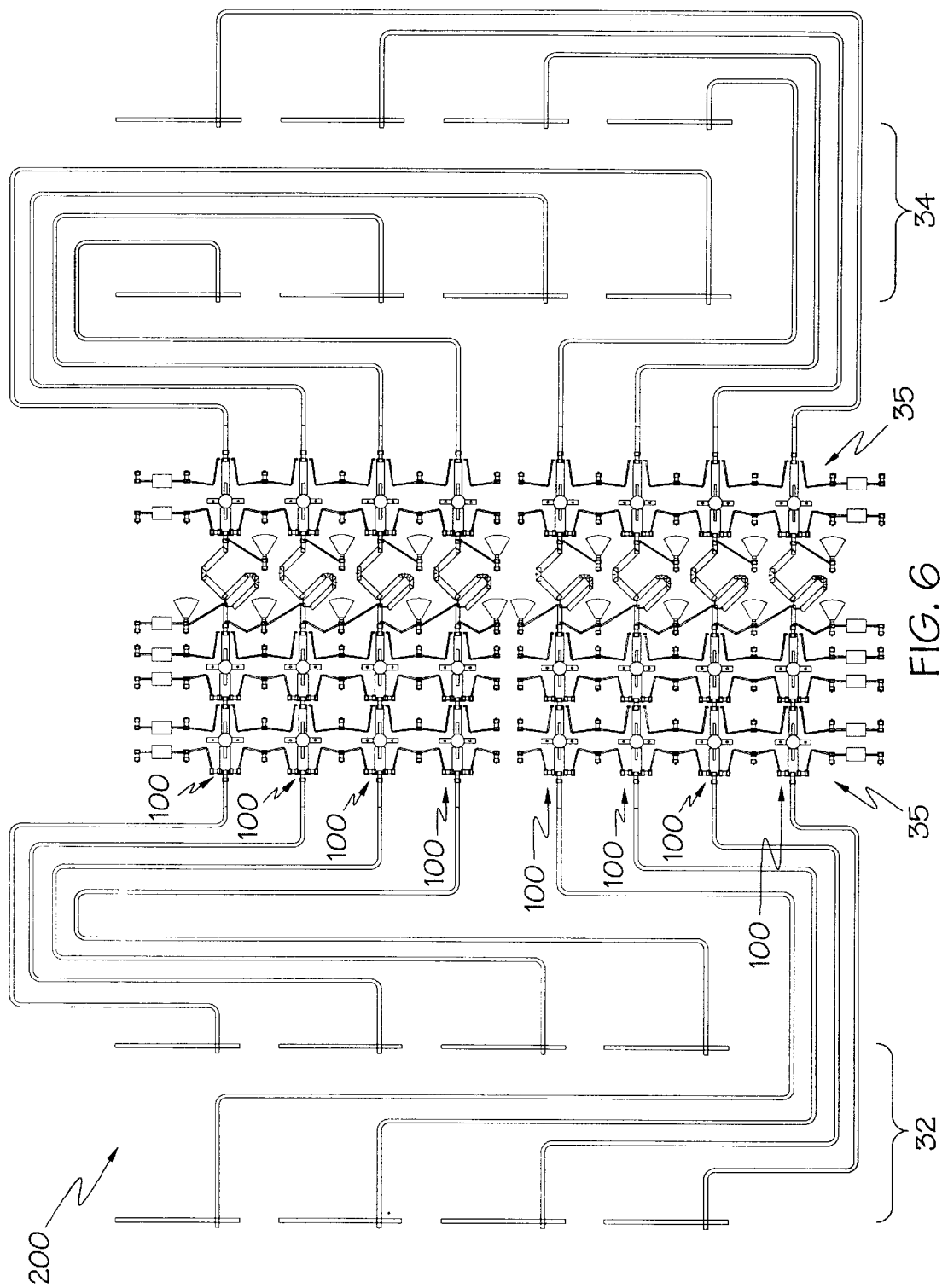
FIG. 6 is an illustration of a circuit board layout suitable for use in a radio frequency tag according to the present invention.

Referring now to FIGS. 5 and 6, an active gain channel configuration of one embodiment of the present invention is described. As is noted herein with reference to FIG. 1, each receiver antenna 32 is coupled to a transmitter antenna 34 via an active gain channel 100 including an array of transmission lines 35. FIG. 5 is a detailed schematic illustration of a representative gain channel 100 and FIG. 6 is an illustration of a microstrip circuit board layout 200 including eight identical representative gain channels 100. Accordingly, FIG. 6 represents a tag including eight receiver antennas 32 and eight transmitter antennas 34. Preferably, the receiver antennas 32 and the transmitter antennas 34 are arranged in respective 2 x 4 arrays to collectively form a Van Atta array. The circuit of FIG. 6 is arranged as a microstrip circuit including a single conductive layer and a single dielectric layer over a ground cladding. The slot antenna elements are cut into and through the ground cladding on the reverse side of the circuit board.

The representative active gain channel 100 illustrated in FIG. 5 includes three substantially identical amplifier stages 110A, 110B, 110C and a radio frequency (RF) modulator stage 120 interposed between the second and third amplifier stages 110B, 110C. The channel 100 includes an input transmission line 101, an output transmission line 140, and a plurality of intermediate transmission lines arranged along the channel 100 between the input transmission line 101 and the output transmission line 140. In FIG. 5, component designators such as "TL5" and "C2" are not reference designations but rather component descriptors corresponding to the following component specifications:

| | | | |
|---|---|---|---|
| C1 = 0.5 pF | R1 = 3.3 kΩ | TL4 = 0.060" × 0.150" | TL10 = 0.040" × 0.029" |
| C2 = 1.0 pF | R2 = 180 Ω | TL5 = 0.010" × 0.280" | TL11 = 0.050" × 0.158" |
| C3 = 1000 pF | | TL6 = 0.010" × 0.190" | |
| | TL1 = 0.031" × 0.100" | TL7 = 0.031" × 0.125" | VGS1 = −0.22 V |

-continued

| | | | |
|---|---|---|---|
| CR1 = MA4E2502L | TL2 = 0.010" × 0.210" | TL9 = 0.040" × 0.170" | VDS1 = +2.00 V |
| Q1 = FHC40LG | TL3 = 0.080" × 0.140" | TL8 = 0.031" × 0.103" | VMOD = 2.2 Vpp |
| | | Sec. Ang. = 60° | |

The resulting circuitry is characterized by the following performance specifications: Max Supply Current (per channel)=70 mA; RF Gain (VMOD=2V)=(30.5+/−1)dB at 9–10 GHz; RF Carrier Suppression (−10 dBm out)>20 dB; Input return Loss=−10 dB Typ. at 9–10 GHz; Modulation BW=3.2 MHz (50 Ω); and Modulation Type=BPSK. Each of the amplifier stages 110A, 110B, 110C are designed to present a 50 Ohm impedance to the preceding and following stages. In the following description, terms referring to wavelength, such as "a half-wavelength transmission line", mean wavelength at the radio frequency at which the tag is designed to operate, for example 10 GHz.

The RF transmission lines TL1, TL2, etc., comprise microstrip transmission lines, the dimensions of which are listed above and may vary with the specific printed circuit board dielectric selected for a particular application. Microstrip transmission lines have the fundamental advantage of a single ground plane and the corresponding ease of circuitry access. Twenty dB isolation between transmission lines was achievable with microstrip on a 0.01" thick substrate at X-band frequencies. A thick metal cladding may be attached to the substrate for support.

Referring initially to the first amplifier stage 110A of the single representative active gain channel 100 illustrated in FIG. 5, the 50 Ohm input transmission line 101 conveys a received radio frequency (RF) signal from a receiver antenna 32 to the input of the first amplifier stage 110A. A coupling capacitor 104 couples the signal to an intermediate transmission line 103 while isolating the DC bias voltage present on the transmission line 103 from the input transmission line 101. The intermediate transmission line 103 along with coupling capacitor 104 provides an impedance match between the 50 Ohm input impedance and the gate input impedance of a High Electron Mobility Transistor (HEMT) 111.

A resistor 106, a high-impedance quarter-wavelength transmission line 107, and a bypass capacitor 108 form an RF isolation network to decouple RF from the gate bias voltage supply. The gate bias voltage VGS1 is supplied to a terminal 109 by a suitable power supply (not shown). Bypass capacitor 108 provides a low RF impedance to ground at the terminal 109 and one end of the high-impedance quarter wavelength transmission line 107. A quarter-wavelength transmission line acts as an impedance transformer, such that a quarter-wave line short circuited at one end presents an open circuit to RF at the other end. The transmission line 107 transforms the low RF impedance to ground provided by bypass capacitor 108 at one end to a high RF impedance at its other end at resistor 106. Consequently, negligible RF current flows in transmission line 107. Resistors 106 and 106' provide additional broadband RF isolation between the input transmission line 101 and the intermediate transmission line 103, preventing parasitic oscillation of the HEMT transistor 111.

The gate bias voltage VGS1 is further connected to the next amplifier in the array through a similar RF isolation network consisting of resistor 106', high-impedance transmission line 107', and bypass capacitor 108' whose function is identical to that of components 106, 107, and 108, as described above. The DC voltage drop across resistors 106 and 106' and similar resistors in each of the amplifier stages 110A, 110B, 110C, is negligible because the gate bias current required by the HEMT transistor 111 is negligible. The input signal supplied to the gate of the HEMT transistor 111 is amplified and output such that the signal present at the drain of the transistor 111 is impedance matched to the desired 50 Ohm output impedance by an additional intermediate transmission line 112.

A high-impedance transmission line 115 and a bypass capacitor 116 form an additional RF isolation network to decouple the RF signal from the drain bias voltage supply VDS1. The drain bias voltage VDS1 is supplied to a conductive terminal 117 by the power supply (not shown). The bypass capacitor 116 provides a low RF impedance to ground at the terminal 117 and one end of the high-impedance transmission line 115. The transmission line 115 is a high-impedance quarter-wavelength transmission line which transforms the low RF impedance at the bypass capacitor 116 to a high RF impedance at the transmission line 112. Consequently, negligible RF current flows in transmission line 115.

The drain bias voltage VDS1 is further connected to the second amplifier stage 110B through a similar RF isolation network consisting of a high-impedance transmission line 115' and a bypass capacitor 116', the function of which is identical to that of components 115 and 116. The DC voltage drop across transmission lines 115, 115' and similar transmission lines in each of the amplifier stages 110A, 110B, 110C is negligible because the DC resistance of the transmission lines is negligible. The second amplifier stage 110B is identical to the first amplifier stage 110A.

In one embodiment of the present invention, a modified single-balanced diode mixer or balanced modulator 120 is used to impress modulation directly upon an RF signal in the microwave frequency band, for example 10 GHz. The modulating information or modulating signal is introduced at a modulation input terminal 127 and is typically in the audio frequency range, having a bandwidth on the order of tens of kilohertz. As will be appreciated by those familiar with single-balanced diode mixers, a single-balanced mixer uses a transformer to provide a balanced signal source. That is, at every instant in time, the voltages at opposite ends of the transformer secondary winding are equal in magnitude but opposite in polarity. According to the present invention, for a single frequency, or a relatively narrow band of frequencies, this condition can be met by using a ½ wavelength transmission line instead of a transformer. If a signal is applied to one end of a ½ wavelength transmission line, the signal at the opposite end is equal in magnitude and 180° out of phase with the input signal. In the tag, a ½ wavelength microstrip transmission line 130 is used for the transformer. The ½ wavelength transmission line 130 is ½ wavelength long at the radar frequency »10 GHz) and is made of three shorter transmission lines 131, 132,133 arranged in a "U" shape so that the opposite ends are close together for connection to a pair of diodes 129, 129'.

The RF signal is coupled from the second amplifier stage 110B to the input end of a transmission line 124 by coupling capacitor 123. The coupling capacitor 123 isolates the transmission line 124 from the DC drain potential of the preceding amplifier stage 110B. The transmission line 124 also matches the impedance at the subsequent junction of the diodes 129 and 129' to the 50 Ohm output impedance of the amplifier stage 110B.

The above-noted modulating signal, having a bandwidth of no more that about a few MHz, is applied to the transmission line 124 and, hence, to the junction of the pair of diodes 129 and 129', through an RF isolation network consisting of a high-impedance transmission line 121, a radial stub 125 and a bypass capacitor 126. The radial stub 125 is an open-circuited quarter-wavelength transmission line. Since a quarter-wavelength transmission line performs an impedance inversion, the open-circuited line presents a low RF impedance to ground at its connection with the transmission line 121 and the bypass capacitor 126. The bypass capacitor 126 provides a low RF impedance to ground over a wide bandwidth. The transmission line 121 is a high-impedance quarter-wavelength transmission line which transforms the low RF impedance at the radial stub 125 and the bypass capacitor 126 to a high RF impedance at the transmission line 124. Consequently, negligible RF current flows in transmission line 124. This isolates the modulating signal from the RF signal.

The modulating signal is further connected to the next balanced modulator in the array through a similar RF isolation network consisting of high-impedance transmission line 121', a radial stub 125', and a bypass capacitor 126', the function of which is identical to that of components 121, 125, and 126, as described above. A series of additional transmission lines 131–135 are grounded to DC, and the modulating signal, by a similar RF isolation network consisting of a high-impedance transmission line 136, a radial stub 137, and a resistor 138. The resistor 138 limits the current flow through the pair of diodes 129 and 129'.

When the modulating signal is sufficiently positive with respect to ground, the first diode 129' is forward biased and the RF signal is free to flow directly from the input transmission line 124 to the output transmission lines 134 and 135. At the same time, the second diode 129 is reverse biased, presenting an open circuit to the end of half-wavelength transmission line made up of transmission lines 131–133. When one end of a half-wavelength transmission line is open-circuited the other end of the line also appears as an open circuit, so no RF current flows back into transmission lines 131–133 from output transmission lines 134–135. Conversely, when the modulating signal is sufficiently negative with respect to ground, the first diode 129' is reverse biased and the second diode 129 is forward biased so that the RF signal flows through half-wavelength transmission line 131–133 on the way to the output transmission lines 134–135, and is shifted 180° in phase. The transmission lines 134–135 are arranged to match the output impedance of the modulator 120 to 50 Ohms.

The final amplifier stage 110C is identical to the first two amplifier stages 110A and 110B. The amplified and modulated RF signal present at the output of the final amplifier stage 110C is coupled to output transmission line 140 by a coupling capacitor 142. The coupling capacitor 142 couples the RF signal to the output transmission line 140 while blocking the DC bias voltage VDS1 present at the output of the final amplifier stage 110C. The transmission line 140 conveys the signal to the specific transmitter antenna 34 that corresponds to the specific receiver antenna 32 connected to the input transmission line 101.

Having described the invention in detail and by reference to preferred embodiments thereof, it will be apparent that modifications and variations are possible without departing from the scope of the invention defined in the appended claims. For example, although specific embodiments of the present invention are described herein in the context of airborne objects, it is contemplated that the RF tag system of the present invention may be utilized in connection with a variety of objects.

What is claimed is:

1. A radio frequency tag system comprising an interrogator and a tag, wherein said tag is secured to an object and wherein:

said interrogator is configured to generate a transmitted electromagnetic interrogation signal at a predetermined interrogation frequency;

said tag comprises an antenna array including a plurality of receiver antennas and a plurality of transmitter antennas;

said tag is positioned to receive said interrogation signal at said receiver antennas and is operative to return a reflected signal to said interrogator via said transmitter antennas in response to receipt of said interrogation signal;

said tag is configured to generate said reflected signal by suppressing reflection of said interrogation signal, and generating reflected radiation characterized by a frequency spectrum including a plurality of return bands, each of said return bands being characterized by a predetermined return band frequency; and said interrogator is configured to detect radiation reflected at said return band frequencies, discriminate between return bands of different frequencies, and identify a binary code defined by said reflected radiation across said plurality of return bands.

2. A radio frequency tag system as claimed in claim 1 wherein said binary code defined by said reflected radiation includes data bits, a start bit, and a stop bit.

3. A radio frequency tag system as claimed in claim 1 wherein:

said binary code defined by said reflected radiation includes data bits distributed across said frequency spectrum of said reflected radiation;

a state of each of said data bits is defined as a function of whether reflected radiation is detected in a corresponding one of said return band frequencies; and said interrogator is configured to identify said binary code by recognizing the presence or absence of reflected radiation at each of said return band frequencies.

4. A radio frequency tag system as claimed in claim 3 wherein said tag is configured to generate successive reflected signals defining distinct binary codes.

5. A radio frequency tag system as claimed in claim 4 wherein said successive reflected signals are selected to define a predetermined data message including a plurality of said distinct binary codes.

6. A radio frequency tag system as claimed in claim 4 wherein said tag is configured such that each of said distinct binary codes includes a word identifier defined by selected ones of said data bits within said binary code.

7. A radio frequency tag system as claimed in claim 4 wherein said interrogator is arranged to detect a complete set of said successive reflected signals in a single scan of said tag.

8. A radio frequency tag system as claimed in claim 4 wherein said interrogator is arranged to detect an individual one of a complete set of said successive reflected signals in a single scan of said tag.

9. A radio frequency tag system as claimed in claim 3 wherein:

said interrogator is configured to transmit an interrogation signal;

said tag is configured to operate in a data readout mode in response to said interrogation signal; and said tag is configured such that said data readout mode is characterized by generation of successive reflected signals defining distinct binary codes.

10. A radio frequency tag system as claimed in claim 3 wherein:

said interrogator is configured to transmit an interrogation signal;

said tag is configured to operate in an object identification mode characterized by generation of said reflected signal by said tag and identification of said binary code by said interrogator;

said tag is configured to operate in a data readout mode in response to detection of said interrogation signal; and said tag is configured such that said data readout mode is characterized by generation of successive reflected signals defining distinct binary codes.

11. A radio frequency tag system as claimed in claim 1 wherein:

said object is characterized by a predetermined object radar cross section; and said tag is configured to generate said reflected signal characterized by a predetermined return band radar cross section that is substantially equal to said predetermined object radar cross section.

12. A radio frequency tag system as claimed in claim 1 wherein:

said object is arranged to move relative to stationary background matter;

said interrogator is configured to discriminate against radiation reflected from said background matter within a clutter frequency band; and said tag is configured such that said return band frequencies lie outside of said clutter frequency band.

13. A radio frequency tag system as claimed in claim 1 wherein:

said interrogator is configured to detect radiation reflected from said object at a Doppler-shifted frequency representative of a velocity of said object relative to said interrogator;

said tag is configured such that said return band frequencies lie outside of a Doppler-shifted frequency band including said Doppler-shifted frequency.

14. A radio frequency tag system as claimed in claim 1 wherein:

said object is arranged to move relative to stationary background matter;

said interrogator is configured to detect radiation reflected from said object at a Doppler-shifted frequency representative of a velocity of said object relative to said interrogator;

said interrogator is configured to discriminate against radiation reflected from said background matter within a clutter frequency band; and said tag is configured such that said return band frequencies lie outside of said clutter frequency band and outside of a Doppler-shifted frequency band including said Doppler-shifted frequency.

15. A radio frequency tag system as claimed in claim 1 wherein:

said tag comprises an antenna array including a plurality of receiver antennas and a plurality of transmitter antennas;

said tag is positioned to receive said interrogation signal at said receiver antennas and is operative to return said reflected signal to said interrogator via said transmitter antennas in response to receipt of said interrogation signal at said receiver antennas;

said receiver antennas comprise a plurality of parallel antenna elements oriented in a first direction;

said transmitter antennas comprise a plurality of parallel antenna elements oriented in a second direction orthogonal to said first direction;

said receiver antennas and said transmitter antennas lie in a common plane;

said receiver antennas are coupled to corresponding transmitter antennas along an array of transmission lines; and said receiver antennas and said transmitter antennas are separated by radio frequency absorbing material arranged to suppress radio frequency coupling between said receiver antennas and said transmitter antennas.

16. A radio frequency tag system comprising an interrogator and a tag, wherein said tag is secured to an object moving relative to stationary background matter and wherein:

said interrogator is configured to generate a transmitted electromagnetic interrogation signal in the direction of said object at a predetermined interrogation frequency;

said tag comprises an antenna array including a plurality of receiver antennas and a plurality of transmitter antennas;

said tag is positioned to receive said interrogation signal at said receiver antennas and is operative to return a reflected signal to said interrogator via said transmitter antennas in response to receipt of said interrogation signal;

said tag is configured to generate said reflected signal by suppressing reflection of said interrogation signal, and generating reflected radiation characterized by a frequency spectrum including at least one return band characterized by a predetermined return band frequency;

said interrogator is configured to detect radiation reflected from said object at a Doppler-shifted frequency representative of a velocity of said object relative to said interrogator;

said interrogator is configured to detect radiation reflected from said tag at said return band frequency;

said interrogator is configured to discriminate against radiation reflected from said background matter within a clutter frequency band; and said tag is configured such that said return band frequency lies outside of said clutter frequency band and outside of a Doppler-shifted frequency band including said Doppler-shifted frequency.

17. A radio frequency tag system as claimed in claim 16 wherein said interrogator comprises an airborne radar system mounted to a moving object and wherein said tag is mounted to an additional moving airborne object.

18. A radio frequency tag system as claimed in claim 16 wherein:

said object is characterized by a predetermined object radar cross section; and said tag is configured to generate said reflected signal such that said reflected signal is characterized by a predetermined return band radar cross section that is substantially equal to said predetermined object radar cross section.

19. A radio frequency tag system as claimed in claim 16 wherein:

said tag is configured to generate said reflected signal by generating reflected radiation characterized by a frequency spectrum including a plurality of return bands, each of said return bands being characterized by a predetermined return band frequency;

said interrogator is configured to detect radiation reflected at said return band frequencies, discriminate between return bands of different frequencies, and identify a binary code defined by said reflected radiation across said plurality of return bands.

20. A radio frequency tag system as claimed in claim 19 wherein each of said return bands lie outside of said clutter frequency band and said Doppler-shifted frequency band.

21. A radio frequency tag system as claimed in claim 16 wherein:

said tag comprises an antenna array including a plurality of receiver antennas and a plurality of transmitter antennas;

said tag is positioned to receive said interrogation signal at said receiver antennas and is operative to return said reflected signal to said interrogator via said transmitter antennas in response to receipt of said interrogation signal at said receiver antennas;

said receiver antennas comprise a plurality of parallel antenna elements oriented in a first direction;

said transmitter antennas comprise a plurality of parallel antenna elements oriented in a second direction orthogonal to said first direction;

said receiver antennas and said transmitter antennas lie in a common plane;

said receiver antennas are coupled to corresponding transmitter antennas along an array of transmission lines; and said receiver antennas and said transmitter antennas are separated by radio frequency absorbing material arranged to suppress radio frequency coupling between said receiver antennas and said transmitter antennas.

22. A radio frequency tag system comprising an interrogator and a tag, wherein said tag is secured to an object and wherein:

said interrogator is configured to generate a transmitted electromagnetic interrogation signal at a predetermined interrogation frequency;

said object is characterized by a predetermined object radar cross section;

said tag comprises an antenna array including a plurality of receiver antennas and a plurality of transmitter antennas;

said tag is positioned to receive said interrogation signal at said receiver antennas and is operative to return a reflected signal to said interrogator via said transmitter antennas in response to receipt of said interrogation signal;

said tag is configured to generate said reflected signal by suppressing reflection of said interrogation signal, and generating reflected radiation characterized by a frequency spectrum including at least one return band characterized by a predetermined return band frequency and radar cross section;

said tag is configured to generate said return band such that said return band radar cross section is substantially equal to said predetermined object radar cross section; and said interrogator is configured to detect radiation reflected at said return band frequency.

23. A radio frequency tag system as claimed in claim 22 wherein said tag comprises an active Van Atta array.

24. A radio frequency tag system as claimed in claim 22 wherein said tag includes a balanced modulator arranged to contribute to said suppressed reflection of said interrogation signal and said generation of said reflected radiation.

25. A radio frequency tag system as claimed in claim 22 wherein:

said tag is configured to generate said reflected signal by generating reflected radiation characterized by a frequency spectrum including a plurality of return bands such that each of said return bands is characterized by a predetermined return band frequency, and each of said return bands is characterized by substantially equal radar cross sections; and said interrogator is configured to detect radiation reflected at said return band frequencies and discriminate between return bands of different frequencies.

26. A radio frequency tag system as claimed in claim 22 wherein:

said tag is configured to generate said reflected signal by generating reflected radiation characterized by a frequency spectrum including a plurality of return bands, each of said return bands being characterized by a predetermined return band frequency;

said interrogator is configured to detect radiation reflected at said return band frequencies, discriminate between return bands of different frequencies, and identify a binary code defined by said reflected radiation across said plurality of return bands.

27. A radio frequency tag system as claimed in claim 22 wherein:

said object is arranged to move relative to stationary background matter;

said interrogator is configured to detect radiation reflected from said object at a Doppler-shifted frequency representative of a velocity of said object relative to said interrogator;

said interrogator is configured to discriminate against radiation reflected from said background matter within a clutter frequency band; and said tag is configured such that said return band frequency lies outside of said clutter frequency band and outside of a Doppler-shifted frequency band including said Doppler-shifted frequency.

28. A radio frequency tag system as claimed in claim 22 wherein:

said tag comprises an antenna array including a plurality of receiver antennas and a plurality of transmitter antennas;

said tag is positioned to receive said interrogation signal at said receiver antennas and is operative to return said reflected signal to said interrogator via said transmitter antennas in response to receipt of said interrogation signal at said receiver antennas;

said receiver antennas comprise a plurality of parallel antenna elements oriented in a first direction;

said transmitter antennas comprise a plurality of parallel antenna elements oriented in a second direction orthogonal to said first direction;

said receiver antennas and said transmitter antennas lie in a common plane;

said receiver antennas are coupled to corresponding transmitter antennas along an array of transmission lines; and said receiver antennas and said transmitter antennas are separated by radio frequency absorbing material arranged to suppress radio frequency coupling between said receiver antennas and said transmitter antennas.

29. A radio frequency tag system comprising an interrogator and a tag, wherein said tag is secured to an object and wherein:

said interrogator is configured to generate a transmitted electromagnetic interrogation signal at a predetermined interrogation frequency;

said tag comprises an antenna array including a plurality of receiver antennas and a plurality of transmitter antennas;

said tag is positioned to receive said interrogation signal at said receiver antennas and is operative to return a reflected signal to said interrogator via said transmitter antennas in response to receipt of said interrogation signal at said receiver antennas;

said receiver antennas comprise a plurality of parallel antenna elements oriented in a first direction;

said transmitter antennas comprise a plurality of parallel antenna elements oriented in a second direction orthogonal to said first direction;

said receiver antennas and said transmitter antennas lie in a common plane;

said receiver antennas are coupled to corresponding transmitter antennas along an array of transmission lines;

said receiver antennas and said transmitter antennas are separated by radio frequency absorbing material arranged to suppress radio frequency coupling between said receiver antennas and said transmitter antennas;

said tag is configured to generate said reflected signal by suppressing reflection of said interrogation signal, and generating reflected radiation characterized by a frequency spectrum including at least one return band characterized by a predetermined return band frequency;

said interrogator is configured to detect radiation reflected at said return band frequency.

30. A radio frequency tag system as claimed in claim 29 wherein said antenna elements comprise slot antennas.

31. A radio frequency tag system as claimed in claim 29 wherein said antenna elements of said receiver array and said transmitter array lie in a common plane, and wherein said radio frequency absorbing material is positioned in said common plane between adjacent transmission lines.

32. A radio frequency tag system as claimed in claim 29 wherein:

said tag is configured such that respective active gain channels couple each of said receiver antennas to corresponding ones of said transmitter antennas; and each of said respective active gain channels include at least one radio frequency modulator stage positioned between an input radio frequency amplifier stage and an output radio frequency amplifier stage.

33. A radio frequency tag system as claimed in claim 32 wherein said modulator stage comprises a balanced modulator.

34. A radio frequency tag system as claimed in claim 29 wherein:

said tag is configured such that respective active gain channels couple each of said receiver antennas to corresponding ones of said transmitter antennas;

each of said respective active gain channels include at least one radio frequency modulator stage and at least one radio frequency amplifier stage; and said modulator stage includes a radio frequency isolation network.

35. A radio frequency tag system as claimed in claim 34 wherein said radio frequency isolation network includes a plurality of transmission lines and at least one radial stub.

36. A radio frequency tag system as claimed in claim 34 wherein:

said tag is configured such that respective active gain channels couple each of said receiver antennas to corresponding ones of said transmitter antennas; and each of said respective active gain channels include a balanced modulator comprising a ½ wavelength transmission line.

37. A radio frequency tag system as claimed in claim 36 wherein said ½ wavelength transmission line comprises three microstrip transmission lines arranged in a "U" shape.

38. A radio frequency tag system as claimed in claim 29 wherein:

said object is characterized by a predetermined object radar cross section;

said tag is configured to generate said reflected signal characterized by a predetermined return band radar cross section that is substantially equal to said predetermined object radar cross section.

39. A radio frequency tag system as claimed in claim 29 wherein:

said tag is configured to generate said reflected signal by generating reflected radiation characterized by a frequency spectrum including a plurality of return bands, each of said return bands being characterized by a predetermined return band frequency;

said interrogator is configured to detect radiation reflected at said return band frequencies, discriminate between return bands of different frequencies, and identify a binary code defined by said reflected radiation across said plurality of return bands.

40. A radio frequency tag system as claimed in claim 29 wherein:

said object is arranged to move relative to stationary background matter;

said interrogator is configured to detect radiation reflected from said object at a Doppler-shifted frequency representative of a velocity of said object relative to said interrogator;

said interrogator is configured to discriminate against radiation reflected from said background matter within a clutter frequency band; and said tag is configured such that said return band frequency lies outside of said clutter frequency band and outside of a Doppler-shifted frequency band including said Doppler-shifted frequency.

* * * * *